(12) United States Patent
Watabe et al.

(10) Patent No.: US 11,999,202 B2
(45) Date of Patent: Jun. 4, 2024

(54) PNEUMATIC TIRE

(71) Applicant: The Yokohama Rubber Co., LTD., Tokyo (JP)

(72) Inventors: Daichi Watabe, Kanagawa (JP); Atsushi Tanno, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 276 days.

(21) Appl. No.: 17/594,171

(22) PCT Filed: Apr. 3, 2020

(86) PCT No.: PCT/JP2020/015321
§ 371 (c)(1),
(2) Date: Oct. 5, 2021

(87) PCT Pub. No.: WO2020/209197
PCT Pub. Date: Oct. 15, 2020

(65) Prior Publication Data
US 2022/0176752 A1 Jun. 9, 2022

(30) Foreign Application Priority Data

Apr. 11, 2019 (JP) ................................. 2019-075832

(51) Int. Cl.
*B60C 19/00* (2006.01)
(52) U.S. Cl.
CPC .................................. *B60C 19/002* (2013.01)
(58) Field of Classification Search
CPC ...... B60C 19/002; B60C 19/12; B60C 19/122
See application file for complete search history.

(56) References Cited

U.S. PATENT DOCUMENTS

2013/0248071 A1 9/2013 Tanno et al.

FOREIGN PATENT DOCUMENTS

| DE | 10 2009 024 454 A1 | 12/2010 |
|---|---|---|
| DE | 10 2011 078 516 A1 | 1/2012 |
| JP | 2005-138760 A | 6/2005 |
| JP | 2006-44503 A | 2/2006 |
| JP | 2009-292461 A | 12/2009 |
| JP | 2016-34779 A * | 3/2016 |
| JP | 2016-94163 A | 5/2016 |
| JP | 2016-210250 A | 12/2016 |
| JP | 2017-114163 A | 6/2017 |

(Continued)

*Primary Examiner* — Justin R Fischer
(74) *Attorney, Agent, or Firm* — Thorpe North & Western

(57) ABSTRACT

In a pneumatic tire, a sound absorptive member is installed on an inner surface of a tread portion with a sheet material interposed therebetween. The sheet material is fixed relative to the tire inner surface or the sound absorptive member at first fixed regions. The sheet material is not fixed relative to the tire inner surface or the sound absorptive member at a non-fixed region between the first fixed regions. The sheet material is fixed at a second fixed region relative to the other of the tire inner surface or the sound absorptive member ina portion of the non-fixed region. A repair liquid introducing portion connects a closed space and a tire cavity with the sheet material, the closed space being separated from the tire cavity by the tire inner surface and the non-fixed region or the sound absorptive member and the non-fixed region in a meridian cross-section.

12 Claims, 9 Drawing Sheets

(56) References Cited

FOREIGN PATENT DOCUMENTS

| JP | 2017-202788 A | 11/2017 |
| JP | 2017-202790 A | 11/2017 |
| JP | 2019-31289 A | 2/2019 |
| WO | 2019/039180 A1 | 2/2019 |

\* cited by examiner

PNEUMATIC TIRE

TECHNICAL FIELD

The present technology relates to a pneumatic tire in which a sound absorptive member is installed on a tire inner surface, and particularly relates to a pneumatic tire that enables puncture repair without blocking a flow of puncture repair liquid by a sound absorptive member and a fixing means thereof.

BACKGROUND ART

In recent years, one proposed method of reducing tire noise (in particular, cavernous resonance caused by the vibration of the air filled in a cavity portion (tire cavity) formed in a tire when the tire is mounted on a rim) is to install a sound absorptive member formed of a porous material, such as a sponge, in the tire cavity. For example, in the example of Japan Unexamined Patent Publication No. 2005-138760, a sound absorptive member formed of a sponge material is bonded to an inner surface of a tread portion by an adhesive or double-sided tape.

Meanwhile, when a tire mounted on a vehicle is punctured, a puncture repair liquid is injected into the tire via a tire valve to temporarily repair the puncture. However, when a similar puncture repair work is attempted in a pneumatic tire provided with a sound absorptive member as described above, depending on the installation configuration of the sound absorptive member, the flow of the puncture repair liquid is blocked by the sound absorptive member itself or the fixing member for fixing the sound absorptive member to the tire inner surface, and the repair work may not be appropriately performed. For example, in the example of Japan Unexamined Patent Publication No. 2005-138760, when a failure such as a puncture occurs at the section of the tread portion where the sound absorptive member is installed, a problem may occur in which the sound absorptive member adhered to the tread inner surface blocks the flow of the puncture repair liquid and thus the puncture repair liquid cannot reach the failure site.

SUMMARY

The present technology provides a pneumatic tire that enables puncture repair without blocking the flow of puncture repair liquid by the sound absorptive member and the fixing means thereof even when the sound absorptive member is installed on the tire inner surface.

A pneumatic tire according to an embodiment of the present technology includes a tread portion extending in a tire circumferential direction and having an annular shape, a pair of sidewall portions respectively disposed on both sides of the tread portion, and a pair of bead portions each disposed on an inner side of the pair of the sidewall portions in a tire radial direction, the pneumatic tire further includes a carcass layer mounted between the pair of bead portions, a plurality of belt layers disposed on an outer circumference side of the carcass layer in the tread portion, and a sound absorptive member installed on an inner surface of the tread portion with a sheet material interposed between the sound absorptive member and the inner surface of the tread portion, at least a pair of first fixed regions are provided, in which the sheet material is fixed with respect to one of the inner surface of the tread portion or a surface of the sound absorptive member in a portion of the sheet material in a tire width direction, a non-fixed region is provided between the pair of the first fixed regions, in which the sheet material is not fixed with respect to one of the inner surface of the tread portion or the surface of the sound absorptive member, a second fixed region is provided in at least a portion of the non-fixed region, in which the sheet material is to be fixed with respect to the other of the inner surface of the tread portion or the surface of the sound absorptive member, a closed space separated from a tire cavity is formed by the inner surface of the tread portion and the non-fixed region of the sheet material or the surface of the sound absorptive member and the non-fixed region of the sheet material in a meridian cross-section, and a repair liquid introducing portion is provided, the repair liquid introducing portion connecting the closed space and the tire cavity in a portion of the sheet material.

According to an embodiment of the present technology, as described above, when the sound absorptive member is installed with the sheet material interposed therebetween, the first fixed region and the non-fixed region are provided without fixing the entire surface of the sheet material with respect to one of the sound absorptive member or the tire inner surface and then the second fixed region within the non-fixed region is fixed with respect to the other of the sound absorptive member or the tire inner surface. Thus, the sheet material and the sound absorptive member or the sheet material and the tire inner surface are reliably fixed in the first fixed region and the second fixed region, while the flexibility of the sheet material can be maintained without being fixed in the non-fixed region and without the sound absorptive member and the tire inner surface being adhered with the sheet material interposed therebetween. Thus, the flow of the puncture repair liquid can be prevented from being blocked by the sound absorptive member during puncture repair.

Furthermore, the closed space formed naturally by the pair of first fixed region and the non-fixed region is also provided with the repair liquid introducing portion as described above, and thus the puncture repair liquid can reach into the closed space through the repair liquid introducing portion. As a result, even when a sound absorptive member or a sheet material is provided, the puncture repair liquid can be reliably introduced to a failure site, and puncture repair work can be reliably performed.

According to an embodiment of the present technology, at least a portion of the repair liquid introducing portion is preferably provided on an outer side in the tire width direction of the second fixed region. In this way, the puncture repair liquid can be reliably introduced into the closed space.

According to an embodiment of the present technology, a shortest distance d (mm) from a discretionary point p on the sheet material excluding the repair liquid introducing portion to the repair liquid introducing portion, a total tire width SW (mm), and a maximum width LW (mm) of the sheet material in the tire width direction preferably satisfy the following Formula (1). In this way, the time required for the puncture repair liquid to reach the failure site can be reduced, which is advantageous for performing reliable puncture repair work.

$$0 \text{ mm} < d*(LW/SW) \leq 200 \text{ mm} \tag{1}$$

According to an embodiment of the present technology, the sheet material preferably extends continuously over the entire length of the sound absorptive member in the tire circumferential direction. By the sheet material extending in this way, the load due to deformation of the sheet material is distributed in the circumferential direction, and thus the durability of the fixed regions can be improved. In addition, the workability of the manufacturing process of the sheet material and the step of fixing the sheet material can be increased.

According to an embodiment of the present technology, the sheet material is preferably a loop member of a surface fastener configured by a pair of a hook member and a loop member, the hook member being provided with a plurality of hook-shaped engaging elements and the loop member being provided with loop-shaped engaging elements that can engage with the hook-shaped engaging elements. The sheet material is preferably fixed to the inner surface of the tread portion by engaging with the hook member fixed to the inner surface of the tread portion in the first fixed region or the second fixed region. By the sheet material being a loop member of a surface fastener in this way, the flexibility of the sheet material (the loop member) is maintained in the non-fixed region as described above, and thus the loop member with maintained flexibility will work well on the hook member, thereby enabling increasing the engagement force of the surface fastener.

According to an embodiment of the present technology, preferably, the sound absorptive member is a band-like member extending in the tire circumferential direction and has a missing portion in which the sound absorptive member is not present in at least one section in the tire circumferential direction and a length of the missing portion along the tire circumferential direction is 5 mm or more and 150 mm or less. Expansion of the tire due to inflation and/or shear strain of the tire due to contact and rolling on the ground can be tolerated for a long period of time by providing the missing portion without the sound absorptive member extending in the entire circumference, and thus separation of the sound absorptive member can be prevented. Additionally, the missing portion is a flow path for the puncture repair liquid that moves beyond the sound absorptive member from one side to the other side in the tire width direction, which is advantageous for efficiently performing puncture repair.

According to an embodiment of the present technology, a total area S (mm$^2$) of the sheet material, a tire inner circumferential length L (mm) at the tire equator, and a maximum width BW (mm) of the belt layer preferably satisfy the following Formula (2). In this way, the size (the total area S) of the sheet material can be within a suitable range, and the weight increase when providing the sound absorptive member with the sheet material interposed between the sound absorptive member and the tire inner surface can be suppressed.

$$0.07 < S/(L*BW) < 1.0 \quad (2)$$

DETAILED DESCRIPTION

Configurations of embodiments of the present technology will be described in detail below with reference to the accompanying drawings.

Figure 1:
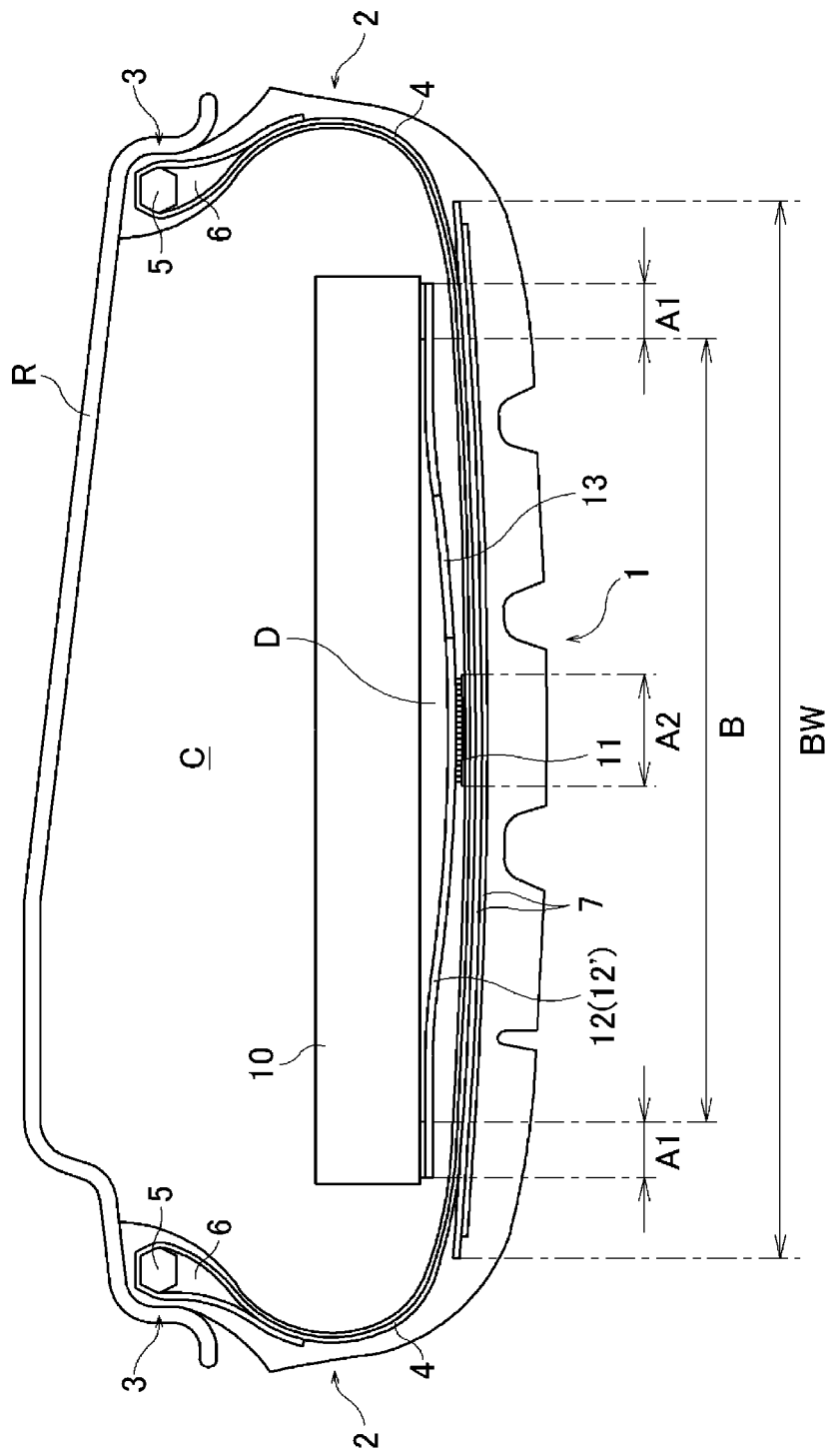
FIG. 1 is a meridian cross-sectional view illustrating a pneumatic tire according to an embodiment of the present technology.
Figure 2:
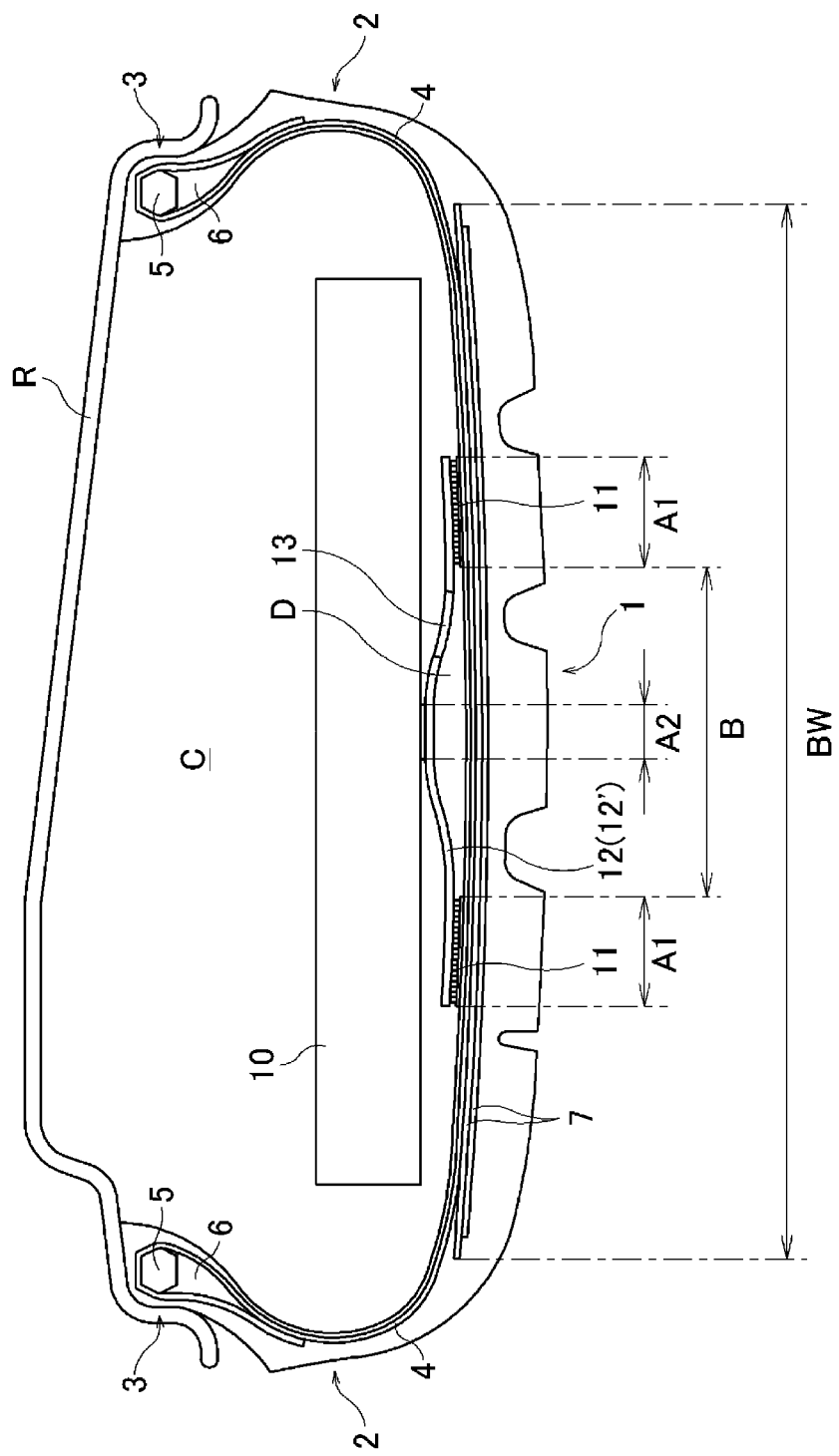
FIG. 2 is a meridian cross-sectional view illustrating a pneumatic tire according to another embodiment of the present technology.

As illustrated in FIGS. 1 and 2, a pneumatic tire of an embodiment of the present technology includes a tread portion 1, a pair of sidewall portions 2 respectively disposed on both sides of the tread portion 1, and a pair of bead portions 3 each disposed on an inner side in a tire radial direction of the pair of sidewall portions 2. R in the drawings represents a rim on which the pneumatic tire is mounted. Note that, FIGS. 1 and 2 are meridian cross-sectional views, and accordingly, although not illustrated, each of the tread portion 1, the sidewall portions 2, and the bead portions 3 extends in the tire circumferential direction to form an annular shape. Thus, the basic structure in a toroidal shape of the pneumatic tire is configured. Other tire components in the meridian cross-sectional view also extend in the tire circumferential direction to form annular shapes unless otherwise indicated.

A carcass layer 4 is mounted between the left-right pair of bead portions 3. The carcass layer 4 includes a plurality of reinforcing cords extending in the tire radial direction, and is folded back around a bead core 5 disposed in each of the bead portions 3 from a vehicle inner side to a vehicle outer side. Additionally, a bead filler 6 is disposed on the periphery of the bead core 5, and the bead filler 6 is enveloped by a body portion and a folded back portion of the carcass layer 4. On the other hand, in the tread portion 1, a plurality of belt layers 7 (two layers in FIG. 1) are embedded on an outer circumference side of the carcass layer 4. The belt layers 7 each include a plurality of reinforcing cords inclining with respect to the tire circumferential direction, and are disposed such that the reinforcing cords of the different layers intersect each other. In these belt layers 7, the inclination angle of the reinforcing cords with respect to the tire circumferential direction is set in a range of, for example, 10° or more and 40° or less. In addition, a belt reinforcing layer (not illustrated) can be provided on the outer circumference side of the belt layers 7. The belt reinforcing layer includes organic fiber cords oriented in the tire circumferential direction, for example. In the belt reinforcing layer, the angle of the organic fiber cords with respect to the tire circumferential direction can be set to, for example, 0° or more and 5° or less.

Embodiments of the present technology relate to an installation configuration used when installing a sound absorptive member 10 as described below with respect to a typical pneumatic tire such as that described above. Thus, the basic cross-sectional structure of the pneumatic tire on which the sound absorptive member 10 is to be installed is not limited to the above-described structure.

According to an embodiment of the present technology, a sound absorptive member 10 is installed in a tire cavity C. The sound absorptive member 10 is formed of a porous material, such as a sponge. The sound absorptive member 10 exhibits predetermined sound absorbing properties due to its porous structure. For example, polyurethane foam can be exemplified as the porous material forming the sound absorptive member 10. The illustrated sound absorptive member 10 has a substantially quadrangular shape in the meridian cross-section and has a band-like structure extending in the tire circumferential direction. However, the shape of the sound absorptive member 10 is not particularly limited. Preferably, as in the illustrated example, the structure has a surface facing the inner surface of the tread portion 1 (hereinafter referred to as the "tire inner surface") and a surface facing the tire cavity C. Such a structure may have, in addition to the substantially quadrangular shape in the cross-section that is illustrated, a surface facing the tire inner surface and a surface facing the tire cavity C each having curved surfaces, and may have a substantially elliptical shape in a meridian cross-section, for example.

Figure 3:
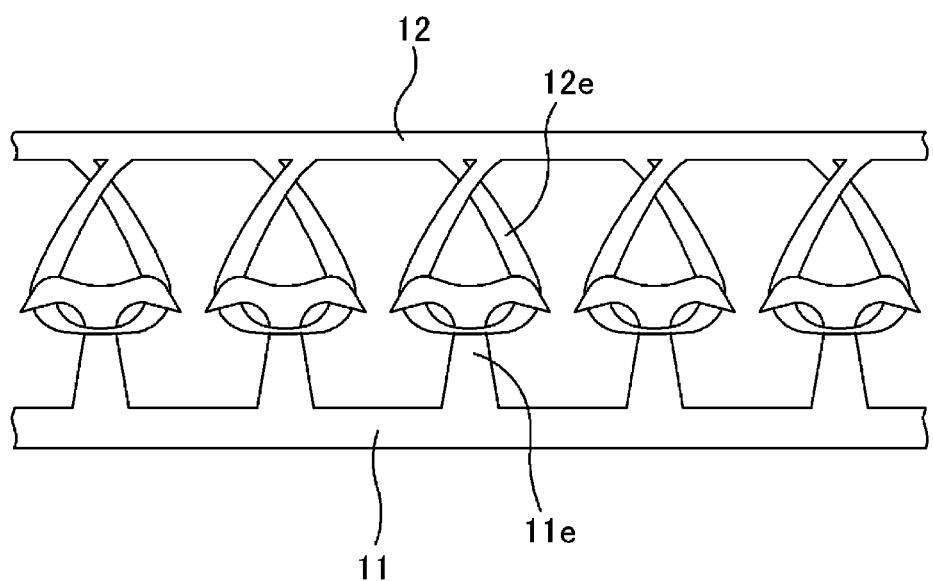
FIG. 3 is an explanatory diagram schematically illustrating an example of a surface fastener according to an embodiment of the present technology.

In the examples in FIGS. 1 and 2, the sound absorptive member 10 is installed on the tire inner surface with a surface fastener interposed therebetween. As illustrated enlarged in FIG. 3, the surface fastener includes a pair of a hook member 11 and a loop member 12. The hook member 11 is a member including a plurality of hook-shaped engaging elements 11e on one surface. The loop member 12 is a sheet material 12' including loop-shaped engaging elements 12e that can engage with the hook-shaped engaging elements 11e. Generally, in a surface fastener including a pair of a hook member 11 and a loop member 12, both members are engaged with each other by the relatively flexible loop member 12 (the loop-shaped engaging elements 12e) catching on the relatively rigid hook member 11 (the hook-shaped engaging elements 11e). FIG. 3 schematically illustrates a state in which the loop member 12 (the loop-shaped engaging elements 12e) is engaged with the hook member 11 (the hook-shaped engaging elements 11e). In the actual hook member 11 and loop member 12, a multiplicity of hook-shaped engaging elements 11e and loop-shaped engaging elements 12e, as illustrated, are provided over the entirety of one surface of each of the hook member 11 and the loop member 12.

The physical properties of the loop member 12 are not particularly limited, but the elongation ratio measured in accordance with the B method (constant load method of fabric) specified in JIS (Japanese Industrial Standard) L1096 "8.16.1 Elongation percentage" is preferably 5% or more and 35% or less, and more preferably 10% or more and 30% or less. The loop member 12 having such an elongation ratio can be flexibly deformed moderately with respect to the movement of the sound absorptive member 10 during rolling of the tire, which is advantageous in preventing the sound absorptive member 10 from falling off from the tire inner surface.

As illustrated, the hook member 11 is fixed to the tire inner surface such that the hook-shaped engaging elements 11e face the tire cavity C side (the loop member 12 side). The fixing method of fixing the hook member 11 with respect to the tire inner surface is not particularly limited. For example, various methods can be employed such as bonding, welding, or engagement with an engagement member provided separately on the tire inner surface. Because the other surface of the hook member 11 is a surface that is to be fixed with respect to a surface of the tire inner surface, the other surface of the hook member 11 is preferably processed into a structure corresponding to a fixing method of fixing the hook member 11 with respect to the tire inner surface (for example, a smooth surface in the case of bonding). Preferably, the other surface of the hook member 11 is entirely fixed with respect to the tire inner surface.

At least one hook member 11 is provided on the tire inner surface in the tire meridian cross-section illustrated in the drawings. The position at which the hook member 11 is fixed is set in accordance with the arrangement of the sound absorptive member 10. However, when one hook member 11 is provided as illustrated in FIG. 1, for example, the hook member 11 is preferably provided at or near the center in the tire width direction. Additionally, when a plurality of hook members 11 are provided as in FIG. 2, the hook members 11 are preferably disposed at intervals, preferably at equal intervals in the tire width direction.

As illustrated, the loop member 12 is fixed to a surface of the sound absorptive member 10 (a surface facing to the inner surface of the tread portion 1) such that the loop-shaped engaging elements 12e face the tire inner surface side (the hook member 11 side). The fixing method of fixing the loop member 12 with respect to the sound absorptive member 10 is not particularly limited. For example, various methods can be employed such as bonding, welding, or engagement with an engagement member provided separately on the sound absorptive member 10. Also, when the loop member 12 is formed of a fabric material including, on its surface, engaging elements 12e formed of loop-shaped fibers, the loop member 12 can be sewn to the sound absorptive member 10 with a thread using a sewing machine or the like. The other surface of the loop member 12 is a surface that is to be fixed with respect to the sound absorptive member 10, and thus the other surface of the loop member 12 is preferably processed into a structure corresponding to the fixing method.

Alternatively, depending on the structure of the loop member 12 (for example, when the loop member 12 includes the same fabric material on front and back), loop-shaped engaging elements 12e may also be present on the other surface.

In the tire meridian cross-section illustrated in the drawings, the loop member 12 is not entirely fixed to one of the sound absorptive member 10 or the tire inner surface in the tire width direction, and at least two sections in the tire width direction are partially fixed with respect to one of the sound absorptive member 10 or the tire inner surface. For example, in the example in FIG. 1, the loop member 12 is fixed with respect to the sound absorptive member, and in the example in FIG. 2, the loop member 12 is fixed (engaged) with respect to the tire inner surface. As a result, a pair of first fixed regions A1 that are fixed with respect to one of the sound absorptive member 10 or the tire inner surface and a non-fixed region B that is not fixed with respect to one of the sound absorptive member 10 or the tire inner surface are formed in the loop member 12. In other words, the loop member 12 includes at least a pair of first fixed regions A1 disposed partially on one of a surface of the sound absorptive member 10 or the tire inner surface in the tire meridian cross-section, and at least one non-fixed region B sandwiched between the pair of first fixed regions A1. Note that, in the example in FIG. 1, a section where the loop member 12 is fixed with respect to the sound absorptive member is the first fixed region A1, and in the example in FIG. 2, a section where the loop member 12 and the hook member 11 are engaged is the first fixed region A1.

Additionally, the loop member 12 is fixed with respect to the other of the sound absorptive member 10 or the tire inner surface. Specifically, a portion of the non-fixed region B of the loop member 12 (a second fixed region A2) is fixed with respect to the other of the sound absorptive member 10 or the tire inner surface. For example, in the example in FIG. 1, the loop member 12 is fixed to the sound absorptive member 10 in the first fixed regions A1, and thus the loop member 12 is fixed (engaged) with respect to the tire inner surface in the second fixed region A2. In the example in FIG. 2, the loop member 12 is fixed (engaged) to the tire inner surface in the first fixed regions A1, and thus the loop member 12 is fixed with respect to the sound absorptive member 10 in the second fixed region A2.

In this manner, when the sound absorptive member 10 is installed on the tire inner surface using the surface fastener, the surface of the loop member 12 is partially fixed only in the first fixed regions A1 and the second fixed region A2 to the sound absorptive member 10 or the tire inner surface without fixing the entire surface of the loop member 12 with respect to the sound absorptive member 10 or the tire inner surface, and the first fixed regions A1 and the second fixed region A2 do not overlap. Thus, the loop member 12 and the sound absorptive member 10 or the loop member 12 and the tire inner surface are reliably fixed in the respective fixed regions, while the flexibility of the loop member 12 can be maintained without being fixed in the non-fixed region B. In such a fixed configuration, the sound absorptive member 10 and the tire inner surface do not adhere with each other. Thus, when the tire punctures and puncture repair liquid is injected into the tire via the tire valve to temporarily repair the puncture, the flow of the puncture repair liquid is not blocked by the sound absorptive member 10, and a reliable puncture repair can be performed.

When the surface fastener is used as described above, upon engagement of the hook member 11 and the loop member 12, the loop member 12 (the non-fixed region B) with maintained flexibility works well on the hook member 11, thereby enabling increasing the engagement force of the surface fastener. At this time, a closed space D separated from the tire cavity C by the tire inner surface and the non-fixed region B of the loop member 12 or the sound absorptive member 10 and the non-fixed region B of the loop member 12 in a meridian cross-section is formed. Specifically, in the example in FIG. 1, the closed space D is formed by the sound absorptive member 10 and the loop member 12, and in the example in FIG. 2, the closed space D is formed by the tire inner surface and the loop member 12. Because the closed space D is basically blocked from the tire cavity C, even when the puncture repair liquid is injected into the tire via the tire valve when the tire is punctured to temporarily repair the puncture, the puncture repair liquid cannot enter into the closed space D. Thus, according to an embodiment of the present technology, a repair liquid introducing portion 13 that connects the closed space D and the tire cavity C is provided in a portion of the loop member 12. Because the repair liquid introducing portion 13 connects the closed space D and the tire cavity C, the puncture repair liquid can enter into the closed space D through the repair liquid introducing portion 13. In this way, the pneumatic tire of an embodiment of the present technology enables puncture repair without blocking the flow of puncture repair liquid by the sound absorptive member 10 or the fixing means thereof (the surface fastener in the illustrated example) even when the sound absorptive member 10 is installed on the tire inner surface.

Note that, while an example is given in which the sound absorptive member 10 is fixed with a surface fastener interposed between the sound absorptive member 10 and the tire inner surface in the above description, according to an embodiment of the present technology, it is only required that the sound absorptive member 10 is fixed with the sheet material 12' corresponding to the loop member 12 described above interposed therebetween. "Corresponding to the loop member 12 described above" means that the sheet material 12' is formed of a material having similar flexibility as the loop member 12 described above (such as a fabric material, a resin film material, a rubber sheet material, or a composite material thereof), and similar to the loop member 12 described above, has at least a pair of first fixed regions A1 where the sheet material 12' is fixed with respect to one of the tire inner surface or a surface of the sound absorptive member 10 in a portion of the sheet material 12' in the tire width direction, has a non-fixed region B between the pair of the first fixed regions A1 where the sheet material 12' is not fixed with respect to one of the tire inner surface or the surface of the sound absorptive member 10, and has a second fixed region A2 in at least a portion of the non-fixed region B where the sheet material 12' is to be fixed with respect to the other of the tire inner surface or the surface of the sound absorptive member 10. Note that the sheet material 12' does not engage with the hook member 11, and thus the sheet material 12' is partially bonded to the tire inner surface or the sound absorptive member 10 by providing an adhesive or double-sided tape, for example, at the position of the hook member 11 illustrated in the drawing. When the sheet material 12' is used, the effect of increasing the engagement force of the surface fastener is not obtained. However, because the sound absorptive member 10 and the tire inner surface do not adhere due to the flexibility and the structure that is partially fixed to the tire inner surface or the sound absorptive member 10 of the sheet material 12', the flow of the puncture repair liquid can be prevented from being blocked by the sound absorptive member 10. Also, even when the sheet material 12' is used, the closed space D separated from the tire cavity C is formed by the tire inner surface and the non-fixed region B of the sheet material or the sound absorptive member 10 and the non-fixed region B of the sheet material in a meridian cross-section, and thus the repair liquid introducing portion 13 that connects the closed space D and the tire cavity C is provided in a portion of the sheet material 12' to allow the puncture repair liquid to enter into the closed space D.

Figure 5A:
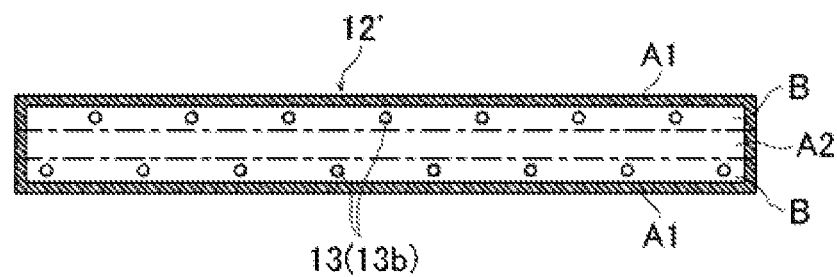
FIGS. 5A and 5B are explanatory diagrams schematically illustrating another example of the repair liquid introducing portion.
Figure 5B:
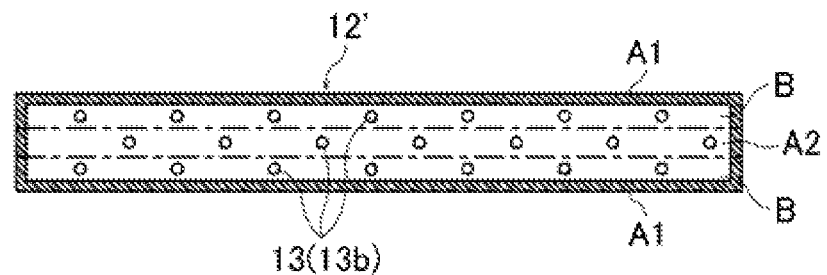
Figure 6:
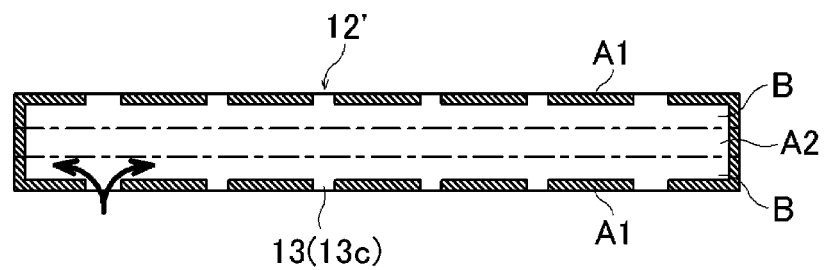
FIG. 6 is an explanatory diagram schematically illustrating another example of the repair liquid introducing portion.
Figure 7A:
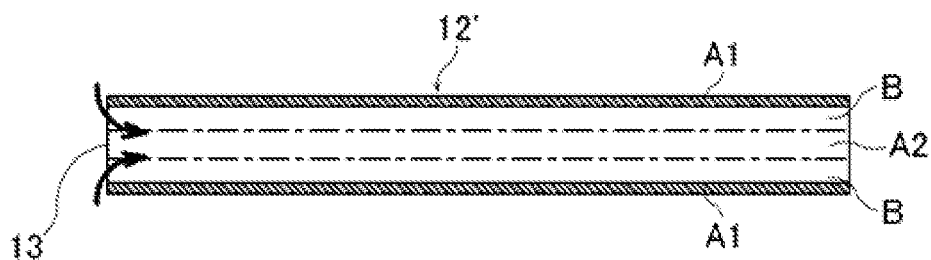
FIGS. 7A and 7B are explanatory diagrams schematically illustrating another example of the repair liquid introducing portion.
Figure 7B:
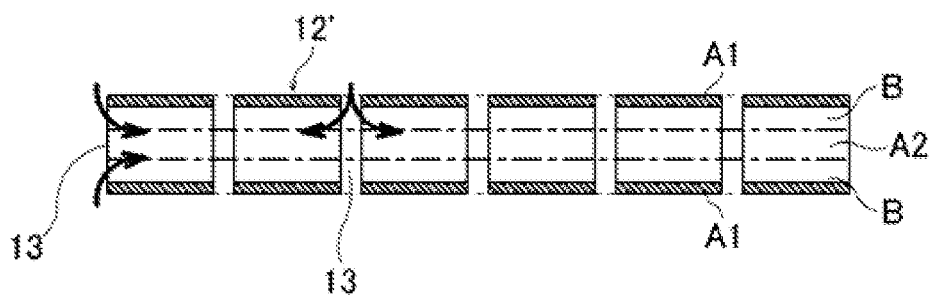

The repair liquid introducing portion 13 can employ the various aspects illustrated in FIGS. 4A to 7B. These repair liquid introducing portions 13 may be used in combination. FIGS. 4A to 7B schematically illustrate sheet materials 12' (loop members 12). In diagrams, the vertical direction is the tire width direction, and the horizontal direction is the tire circumferential direction. In FIGS. 4A to 7B, the hatched portion(s) is the first fixed region A1, a center region in the width direction of the sheet material 12' delimited by dot-dash lines is the second fixed region A2, and the other portions are the non-fixed regions B. In examples illustrated in the drawings, the first fixed region A1 is provided on at least end portions in the tire width direction of the sheet material 12', and the sheet material 12' is fixed to the tire inner surface or the sound absorptive member 10 (not illustrated). In examples illustrated in FIGS. 4A to 6, the first fixed region A1 is additionally provided on end portions in the tire circumferential direction of the sheet material 12'. In other words, the sheet material 12' of FIGS. 4A to 6 has a bag-like shape as a whole having its periphery closed. In FIGS. 6 and 7A-7B, examples of puncture repair liquid entering paths are indicated by arrows for purpose of reference.

Figure 4A:
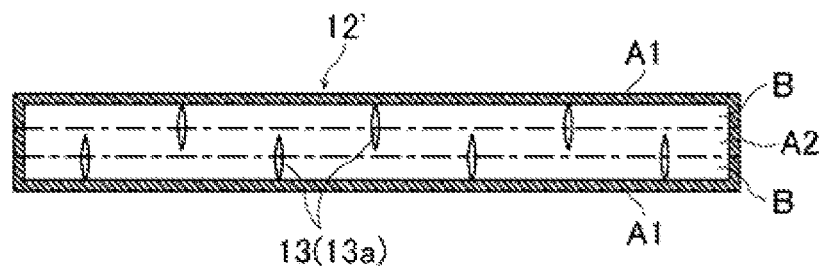
FIGS. 4A to 4C are explanatory diagrams schematically illustrating an example of a repair liquid introducing portion.
Figure 4B:
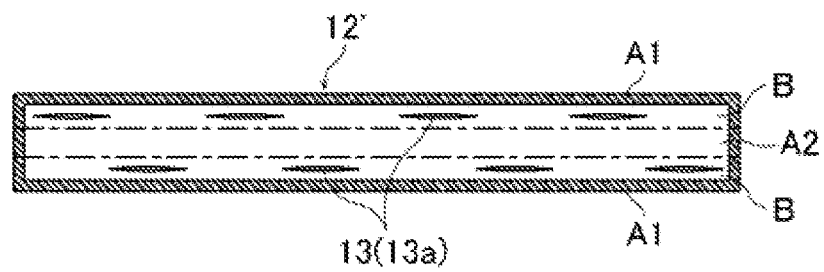
Figure 4C:
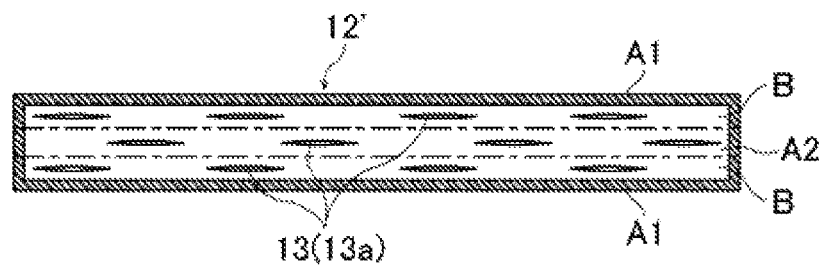

In examples in FIGS. 4A-4C, a plurality of slits 13a that penetrate the sheet material 12' are provided as the repair liquid introducing portions 13. In the example in FIG. 4A, a plurality of slits 13a extending along the tire width direction so as to traverse the non-fixed region B from the first fixed region Al to the second fixed region A2 are provided at intervals along the tire circumferential direction. In the example in FIG. 4B, a plurality of slits 13a extending along the tire circumferential direction are provided at intervals along the tire circumferential direction in each of the non-fixed regions B located on both sides of the second fixed region A2. In any case, the repair liquid introducing portions 13 (the slits 13a) are arranged in a staggered manner with respect to the center in the tire width direction of the sheet material 12'. In the example in FIG. 4C, a plurality of slits 13a extending along the tire circumferential direction are provided at intervals along the tire circumferential direction in each of the non-fixed regions B located on both sides of the second fixed region A2, and the second fixed region A2.

In the example in FIGS. 5A-5B, perforations 13b that penetrate the sheet material 12' are provided as the repair liquid introducing portions 13. In the example in FIG. 5A, a plurality of perforations 13b are provided at intervals along the tire circumferential direction in each of the non-fixed regions B located on both sides of the second fixed region A2. At this time, the perforations 13b are arranged in a staggered manner with respect to the center in the tire width direction of the sheet material 12'. In the example in FIG. 5B, a plurality of perforations 13b are provided at intervals along the tire circumferential direction in each of the non-fixed regions B located on both sides of the second fixed region A2, and the second fixed region A2. In addition to the circular shape illustrated in the drawings, an elliptical shape, a polygonal shape, or the like can be employed as the shape of the perforation 13b.

In the example illustrated in FIG. 6, the first fixed regions A1 are intermittently provided in the tire circumferential direction so that the gaps 13c formed between the first fixed regions A1 adjacent to each other in the tire circumferential direction (the portion where the first fixed region A1 is missing) function as the repair liquid introducing portions 13. In this case, in order to ensure adhesiveness in the first fixed regions A1, the sum of the lengths in the tire circumferential direction of the portions where the first fixed regions Al are missing (the gaps 13c) is preferably 2% or more and 50% or less of the length in the tire circumferential direction of the sheet material 12'.

In the example in FIGS. 7A-7B, by opening the end portions in the circumferential direction of the sheet material 12' instead of the first fixed region A1 to be formed around the entire periphery (four sides including a pair of end portions in the circumferential direction and a pair of end portions in the width direction) of the sheet material 12', the opened end portions function as the repair liquid introducing portions 13. In other words, by providing the non-fixed regions B over the entire length of the sheet material 12', the non-fixed regions B that are opened at the end portions in the tire circumferential direction of the sheet material 12' function as the repair liquid introducing portion 13. In the example illustrated in FIG. 7A, end portions in the circumferential direction of a single sheet material 12' that extends over the entire length of the sound absorptive member 10 (not illustrated) are opened. In this example, as illustrated, puncture repair liquid enters only from both end portions in the circumferential direction of the single sheet material 12'. On the other hand, in the example in FIG. 7B, the plurality of sheet materials 12' are arranged in the circumferential direction with respect to the sound absorptive member 10 (not illustrated) extending in the tire circumferential direction and end portions in the circumferential direction of each sheet material 12' are opened. In this example, as illustrated, puncture repair liquid enters from the end portions in the circumferential direction of each sheet material 12'.

In examples in FIGS. 1 and 2, the closed space D is formed by the sheet material 12' (the loop member 12) being deflected. However, also in the closed space D formed by the sound absorptive member 10 being recessed with respect to the sheet material 12' (the loop member 12), providing the repair liquid introducing portion 13 described above makes it easy for the puncture repair liquid to enter the closed space D, thereby allowing reliable puncture repair.

While a plurality of sheet materials 12' divided in the tire circumferential direction can be provided as the sheet material 12' as the example in FIG. 7B, it is preferable to use a sheet material 12' that is continuous in the tire circumferential direction as illustrated in FIG. 7A from the perspective of workability and cost of bonding the sheet material 12'. Additionally, as illustrated in FIG. 7A, when the sheet material 12' is a continuous sheet material 12' in the tire circumferential direction, deformation of the sheet material 12' when the tire contacts the ground can be distributed in the tire circumferential direction. Thus, the load imparted between the sheet material 12' and the sound absorptive member 10 or the sheet material 12' and the tire inner surface can be reduced, and durability can be improved. Note that this also applies to an aspect other than the aspect in which the end portions in the circumferential direction function as the repair liquid introducing portion 13 as illustrated in FIGS. 7A-7B (and the aspects in which the slits 13a, the perforations 13b, and the gaps 13c are provided as the repair liquid introducing portions as illustrated in FIGS. 4A to 6).

In any of the various aspects described above, at least a portion of the repair liquid introducing portion 13 is preferably provided on an outer side in the tire width direction of the second fixed region A2. As illustrated in FIGS. 1 and 2, the second fixed region A2 is also a region where the sheet material 12' is bonded with respect to the tire inner surface or the sound absorptive member 10, the second fixed region A2 does not sufficiently function as a flow path for the puncture repair liquid to be introduced into the closed space D even when the repair liquid introducing portion 13 is provided in the second fixed region A2. Accordingly, by providing the repair liquid introducing portion 13 at a position off the second fixed region A2, the puncture repair liquid can be reliably introduced into the closed space D.

Figure 8:
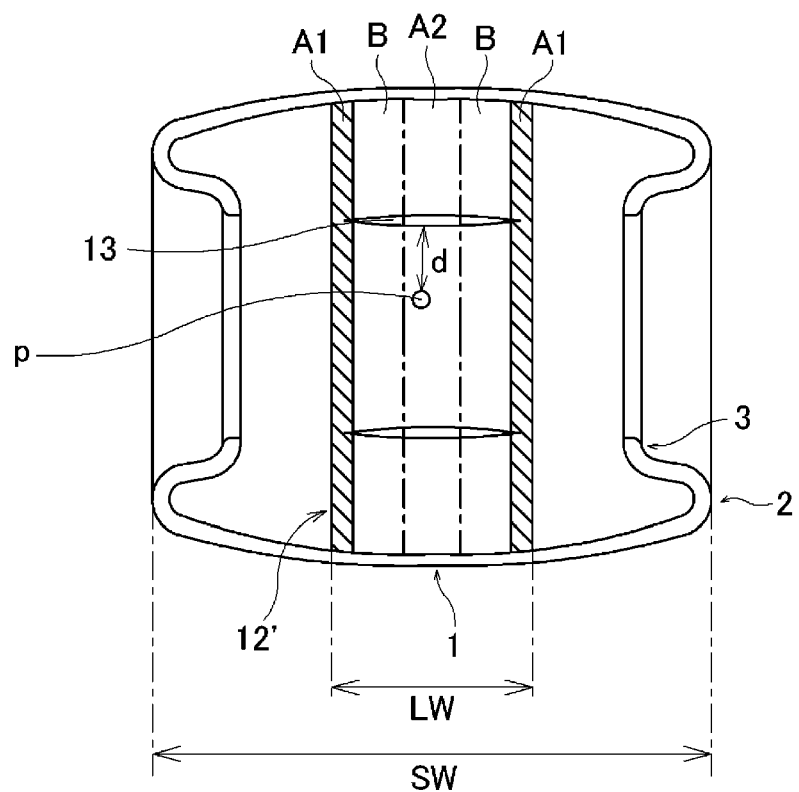
FIG. 8 is a schematic diagram illustrating a positional relationship of the repair liquid introducing portion.

The position where the repair liquid introducing portion 13 is provided is not particularly limited. However, as illustrated in FIG. 8, when d (mm) is a shortest distance from a discretionary point p on the sheet material 12' excluding the repair liquid introducing portion 13 to the repair liquid introducing portion 13, SW (mm) is a total tire width, and LW (mm) is a maximum width of the sheet material 12' in the tire width direction, the shortest distance d (mm), the total tire width SW (mm), and the maximum width LW (mm) preferably satisfy the following Formula (1). Note that in FIG. 8, only the tire main body and the sheet material 12' are schematically illustrated and the sound absorptive member 10 is omitted. In FIG. 8, hatched portions are the first fixed regions A1, a center region in the width direction of the sheet material 12' delimited by dot-dash lines is the second fixed region A2, and the other portions are the non-fixed regions B. The discretionary point p is a point assumed to be a failure site (a puncture position). Thus, by satisfying the following Formula (1), the distance from the repair liquid introducing portion 13 to the failure site is good, the time required for the puncture repair liquid to reach the failure site can be reduced, which is advantageous for performing a reliable puncture repair work.

$$0 \text{ mm} < d*(LW/SW) \leq 200 \text{ mm} \tag{1}$$

When the shortest distance d (mm), the total tire width SW (mm), and the maximum width LW (mm) as described above do not satisfy the Formula (1) and d*(LW/SW) exceeds 200 mm, the distance from the repair liquid introducing portion 13 to a discretionary point p (a failure site) increases and the air pressure may decrease before the puncture repair liquid reaches a failure site to fall below a level at which puncture repair can be performed. When the Formula (1) described above is satisfied, the respective values of the shortest distance d (mm), the total tire width SW (mm), and the maximum width LW (mm) are not particularly limited, however, the shortest distance d (mm) is preferably 250 mm or less, and more preferably 220 mm or less.

Figure 9A:
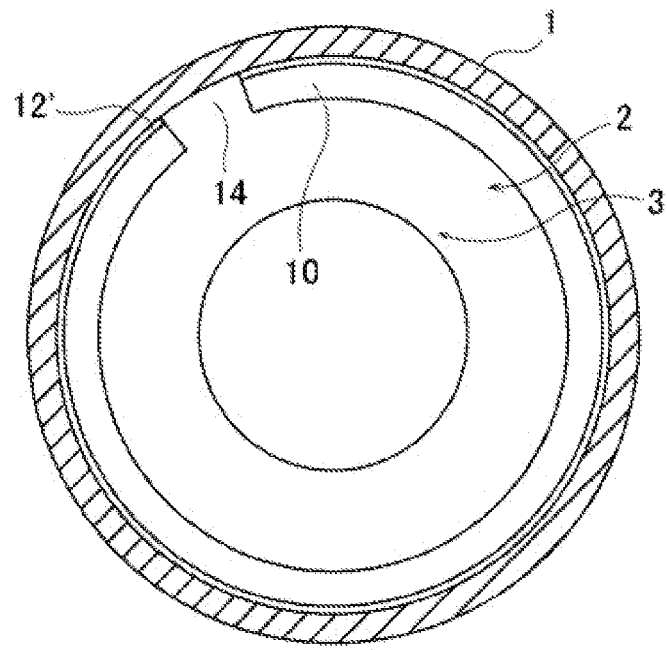
FIGS. 9A and 9B are cross-sectional views taken along an equator line of a pneumatic tire according to another embodiment of the present technology.
Figure 9B:
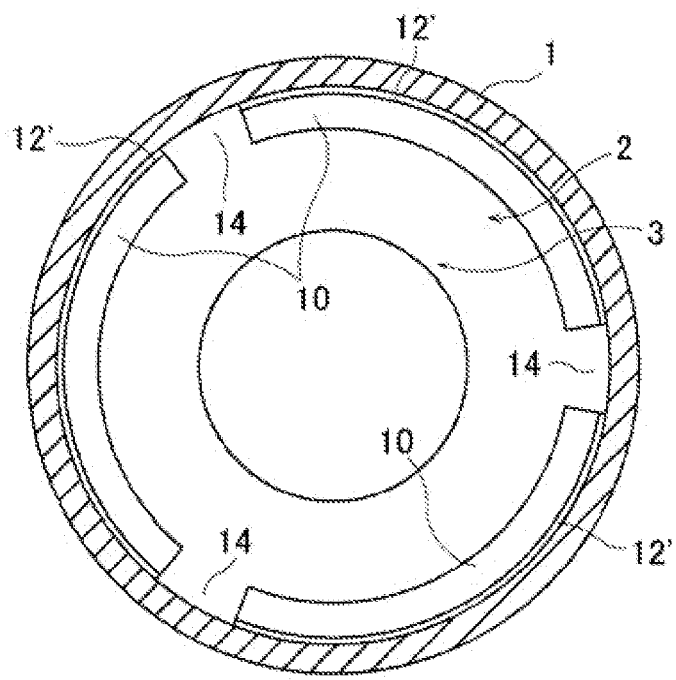

The sound absorptive member 10 is preferably a band-like member extending in the tire circumferential direction as described above. Here, as illustrated in FIG. 9A-9B, the sound absorptive member 10 preferably has a missing portion 14 in which the sound absorptive member 10 is not present in at least one section in the tire circumferential direction. Note that in FIG. 9A, one missing portion 14 is provided, and in FIG. 9B, three missing portions 14 are provided. When a plurality of missing portions 14 are provided as in FIG. 9B, the plurality of sound absorptive members 10 have a structure that is intermittently arranged along the tire circumferential direction, and thus the missing portions 14 correspond to gaps between sound absorptive members 10 adjacent to each other. Expansion of the tire due to inflation and/or shear strain of the tire due to contact and rolling on the ground can be tolerated for a long period of time by providing such a missing portion 14. Furthermore, the missing portion 14 is a flow path for the puncture repair liquid that moves from one side to the other side of the sound absorptive member 10 in the tire width direction, and thus the missing portion 14 is a structure that is advantageous from the perspective of puncture repair. The missing portion 14 is preferably provided at one section or three to five sections on the tire circumference. Note that, providing the missing portions 14 at two sections on the tire circumference causes significant degradation in tire uniformity due to mass unbalance, and providing the missing positions 14 at six or more sections on the circumference causes significant increase in manufacturing cost. The length of the missing portion 14 along the tire circumferential direction is preferably 5 mm or more and 150 mm or less, and more preferably 10 mm or more and 120 mm or less. When the length is less than 5 mm, movement of the puncture repair liquid in the tire width direction may be blocked. When the length exceeds 150 mm, the weight balance in the tire circumferential direction is lost and the uniformity of the tire may be degraded.

The sheet material 12' not only forms the closed space D and blocks the flow of the puncture repair liquid, but can also be a factor of tire weight increase, and thus the sheet material 12' is preferably appropriately sized. Specifically, the total area S (mm$^2$) of the sheet material 12', the tire inner circumferential length L (mm) at the tire equator, and the maximum width BW (mm) of the belt layer preferably satisfy the following Formula (2). In this way, the size (the total area S) of the sheet material 12' can be within a suitable range, and the weight increase when providing the sound absorptive member 10 with the sheet material 12' interposed between the sound absorptive member 10 and the tire inner surface can be suppressed.

$$0.07 < S/(L*BW) < 1.0 \tag{2}$$

When S/(L*BW) is 0.07 or less, the force of bonding the sound absorptive member 10 to the tire inner surface will not be able to be sufficiently ensured. When S/(L*BW) is 1.0 or more, the sheet material 12' increases in size, which may increase the tire weight. The S/(L*BW) is preferably 0.1 or more and 0.97 or less, and more preferably 0.15 or more and 0.85 or less. In examples illustrated in the drawings, the sheet material 12' is fixed to the surface of the sound absorptive member 10 facing the tire inner surface. However, when the range of the Formula (2) described above is satisfied, the sheet material 12' may be provided so as to wrap around the upper surface (the surface facing a rim R) of the sound absorptive member 10 or the side surface (surfaces on both sides in the tire width direction of the sound absorptive member 10).

The invention claimed is:

1. A pneumatic tire, comprising:
   a tread portion extending in a tire circumferential direction and having an annular shape;
   a pair of sidewall portions respectively disposed on both sides of the tread portion; and
   a pair of bead portions each disposed on an inner side of the pair of the sidewall portions in a tire radial direction;
   the pneumatic tire further comprising:
   a carcass layer mounted between the pair of bead portions;
   a plurality of belt layers disposed on an outer circumference side of the carcass layer in the tread portion; and
   a sound absorptive member installed on an inner surface of the tread portion with a sheet material interposed between the sound absorptive member and the inner surface of the tread portion,
   at least a pair of first fixed regions being provided, in which the sheet material is fixed with respect to one of the inner surface of the tread portion or a surface of the sound absorptive member in a portion of the sheet material, the pair of first fixed regions being disposed spaced apart in a tire width direction,
   a non-fixed region being provided between the pair of the first fixed regions in the tire width direction, in which the sheet material is not fixed with respect to one of the inner surface of the tread portion or the surface of the sound absorptive member,
   a second fixed region being provided in at least a portion of the non-fixed region, in which the sheet material is to be fixed with respect to an other of the inner surface of the tread portion or the surface of the sound absorptive member,
   a closed space separated from a tire cavity being formed by the inner surface of the tread portion and the non-fixed region of the sheet material or the surface of the sound absorptive member and the non-fixed region of the sheet material in a meridian cross-section, the closed space extending primarily in the tire circumferential direction, and
   a repair liquid introducing portion being provided, the repair liquid introducing portion connecting the closed space and the tire cavity in a portion of the sheet material.

2. The pneumatic tire according to claim 1, wherein at least a portion of the repair liquid introducing portion is provided on an outer side in the tire width direction of the second fixed region.

3. The pneumatic tire according to claim 1, wherein a shortest distance d (mm) from a discretionary point p on the sheet material excluding the repair liquid introducing portion to the repair liquid introducing portion, a total tire width SW (mm), and a maximum width LW (mm) of the sheet material in the tire width direction satisfy Formula (1):

$$0\text{ mm} < d*(LW/SW) \leq 200\text{ mm} \qquad (1).$$

4. The pneumatic tire according to claim 1, wherein the sheet material extends continuously over an entire length of the sound absorptive member in the tire circumferential direction.

5. The pneumatic tire according to claim 1, wherein
the sheet material is a loop member of a surface fastener configured by a pair of a hook member and a loop member, the hook member being provided with a plurality of hook-shaped engaging elements and the loop member being provided with loop-shaped engaging elements that can engage with the hook-shaped engaging elements, and
the sheet material is fixed to the inner surface of the tread portion by engaging with the hook member fixed to the inner surface of the tread portion in the first fixed regions or the second fixed region.

6. The pneumatic tire according to claim 1, wherein
the sound absorptive member is a band-like member extending in the tire circumferential direction and comprises a missing portion in which the sound absorptive member is not present in at least one section in the tire circumferential direction, and
a length of the missing portion along the tire circumferential direction is 5 mm or more and 150 mm or less.

7. The pneumatic tire according to claim 1, wherein a total area S (mm2) of the sheet material, a tire inner circumferential length L (mm) at a tire equator, and a maximum width BW (mm) of the belt layer satisfy Formula (2):

$$0.07 < S/(L*BW) < 1.0 \qquad (2).$$

8. The pneumatic tire according to claim 2, wherein a shortest distance d (mm) from a discretionary point p on the sheet material excluding the repair liquid introducing portion to the repair liquid introducing portion, a total tire width SW (mm), and a maximum width LW (mm) of the sheet material in the tire width direction satisfy Formula (1):

$$0\text{ mm} < d*(LW/SW) \leq 200\text{ mm} \qquad (1).$$

9. The pneumatic tire according to claim 8, wherein the sheet material extends continuously over an entire length of the sound absorptive member in the tire circumferential direction.

10. The pneumatic tire according to claim 9, wherein
the sheet material is a loop member of a surface fastener configured by a pair of a hook member and a loop member, the hook member being provided with a plurality of hook-shaped engaging elements and the loop member being provided with loop-shaped engaging elements that can engage with the hook-shaped engaging elements, and
the sheet material is fixed to the inner surface of the tread portion by engaging with the hook member fixed to the inner surface of the tread portion in the first fixed region or the second fixed region.

11. The pneumatic tire according to claim 10, wherein
the sound absorptive member is a band-like member extending in the tire circumferential direction and comprises a missing portion in which the sound absorptive member is not present in at least one section in the tire circumferential direction, and
a length of the missing portion along the tire circumferential direction is 5 mm or more and 150 mm or less.

12. The pneumatic tire according to claim 11, wherein a total area S (mm2) of the sheet material, a tire inner circumferential length L (mm) at a tire equator, and a maximum width BW (mm) of the belt layer satisfy Formula (2):

$$0.07 < S/(L*BW) < 1.0 \qquad (2).$$

* * * * *